United States Patent [19]

Ide

[11] Patent Number: 4,586,813

[45] Date of Patent: May 6, 1986

[54] IMAGE FORMING APPARATUS

[75] Inventor: Fumitō Ide, Zama, Japan

[73] Assignee: Kabushiki Kaisha Toshiba, Kawasaki, Japan

[21] Appl. No.: 649,717

[22] Filed: Sep. 12, 1984

[30] Foreign Application Priority Data

Sep. 19, 1983 [JP] Japan ........................ 58-172574
Oct. 12, 1983 [JP] Japan ........................ 58-190328

[51] Int. Cl.[4] .................. G03B 27/48; G03B 27/50; B65H 7/00

[52] U.S. Cl. .................. 355/50; 271/256; 355/3 SH; 355/14 SH

[58] Field of Search ............ 355/50, 51, 3 SH, 14 SH, 355/14 R; 271/256

[56] References Cited

U.S. PATENT DOCUMENTS 4,472,049 9/1984 Honma et al. .................. 355/3 SH

*Primary Examiner*—Richard A. Wintercorn
*Attorney, Agent, or Firm*—Cushman, Darby & Cushman

[57] ABSTRACT

A feed member is selectively driven and brought into contact with an image forming medium so as to feed the image forming medium stored in a storage section in a direction toward an image forming section. A drive mechanism selectively applies a force to the feed member so that the feed member is brought into contact with the medium so as to feed the medium. A controlling means supplies a first control signal to the drive mechanism in response to a medium feed instruction signal. The medium can be sufficiently fed in accordance with the first control signal. The controlling means also supplies a second control signal to the drive mechanism in response to an error processing instruction signal when an error occurs. The feed member is separated from the medium in accordance with the second control signal.

9 Claims, 35 Drawing Figures

IMAGE FORMING APPARATUS

BACKGROUND OF THE INVENTION

This invention relates to an image forming apparatus and, more particularly, to an improvement in an image forming medium (e.g., paper) feed mechanism in an image forming apparatus such as an electronic copying machine.

In a conventional electronic copying machine, image forming media such as paper sheets are fed one by one by a paper feed mechanism from a paper cassette which acts as a medium storage portion. The sheet is then fed to an image transfer (forming) portion. The paper feed mechanism is arranged such that sheets in the paper cassette are picked up by a paper feed roller as a paper pickup member one by one, and that the sheet is then fed by a pair of aligning rollers as a convey member to the image transfer portion. In some cases, the paper feed roller comprises a semicircular roller.

In the conventional copying machine of this type, when a paper jam or a separation error in the transfer portion occurs, the feed roller is immediately stopped at a current position. After the failure is eliminated, the feed roller returns to the initial position (a noncontact position with respect to the uppermost sheet). Assume that an error occurs while the contact portion of the feed roller is kept in contact with the uppermost sheet in the paper cassette, and that the feed roller is stopped in this state. In this case, it is difficult to remove the detachable feed cassette from the housing of the copying machine. In addition, when paper jam occurs, the jammed sheet cannot be easily removed due to interference of the feed roller. Since the feed roller is rotated and returns to the initial position upon elimination of the failure, the sheet contacting the feed roller is accidentally fed. In this case, even if the copying machine is set in the normal operation mode, the respective mechanism must be operated again to discharge the sheet, resulting in inconvenience.

In a feed mechanism in the conventional electronic copying machine of the type described above, automatic paper feeding for automatically feeding sheets from the paper cassette and manual feeding for manually feeding a sheet from a manual feed guide are selectively performed. This feed mechanism adopts a substantially semicircular feed roller for feeding a sheet in the same manner as described above and a pair of aligning rollers as convey rollers for temporarily stopping the sheet so as to align the sheet and for conveying the sheet to the image transfer portion. Solenoids are connected to the paper feed roller and the pair of aligning rollers, respectively. In this manner, the feed roller and the pair of aligning rollers are separately driven by the corresponding solenoids.

In the conventional feed mechanism, the feed roller and the aligning rollers can be separately controlled by the corresponding solenoids. However, the separate drive mechanisms result in an apparatus of high cost, large dimensions and heavy weight. When a single solenoid is used to control the feed roller and the aligning rollers, only signal control operation is performed for automatic feeding and manual feeding. As a result, proper operations cannot be provided for the different feeding modes, and the sheet cannot be precisely fed.

Thus, it is an object of the present invention to provide a new and improved image forming apparatus which has a storage section for storing an image medium and an image forming section for forming images on the image medium. This image forming apparatus uses a non-circular feed roller to feed the image medium from the storage section to the image forming section. The non-circular feed roller is specially constructed with a curved contact portion and a flat non-contact portion, and the feed roller is disposed so that the curved contact portion contacts the image medium when the contact portion is adjacent to the image medium, thus feeding the image medium towards the image forming section. However, the flat contact portion does not contact the image medium when it is adjacent to the image medium. Therefore, when the flat contact portion is adjacent to the image medium, it poses no obstruction to removal of the storage section and the image medium from the apparatus. The image forming apparatus also has a pair of aligning rollers which aligns the image medium which is fed from the storage section.

This non-circular feed roller and aligning rollers are alternately driven by a drive switching device which has a solenoid and a switching means. This switching means alternately drives the non-circular feed roller when the solenoid is in a first position, or the aligning rollers when the solenoid is in a second position. Thus, the solenoid insures that the feed roller and the aligning rollers cannot be driven simultaneously.

Also, a control means supplies instructions to the apparatus. A first control signal causes the solenoid to assume the first position, and thus feed the image medium to the aligning roller means. A second control signal causes the solenoid to assume the second position, thereby feeding the image medium from the aligning rollers to the image forming section. A third control signal moves the non-circular feed roller so that the non-contact portion is adjacent to the image medium. This third control signal is a jam clearing instruction which facilitates removal of the storage section and the image medium from the apparatus.

It is a further object of the present invention to provide an image medium feeding apparatus which has a storage means for containing the image medium. Feed roller means with a contact surface and a non-contact surface, similarly constructed to that described above, functions to feed the image medium. Shaft means are coupled to the feed roller means, and function to rotate the feed roller. This shaft means is formed with an exterior surface which defines at least two external projections. This shaft means is driven by a drive means. A locking means selectively couples with one of the projections which are formed on the shaft means—by coupling with one projection if necessarily releases another projection. Thus, the shaft means is locked by the locking means at discrete locations and a predetermined amount of rotation between the discreet locations is thereby produced. This amount of rotation corresponds to a feeding operation of the image medium from the storage section.

BRIEF DESCRIPTION OF THE DRAWINGS

The present invention can be understood by reference to the accompanying drawings, in which.

DETAILED DESCRIPTION OF THE PREFERRED EMBODIMENTS

A first embodiment of the present invention will be described with reference to FIGS. 1 to 17.

Figure 1:
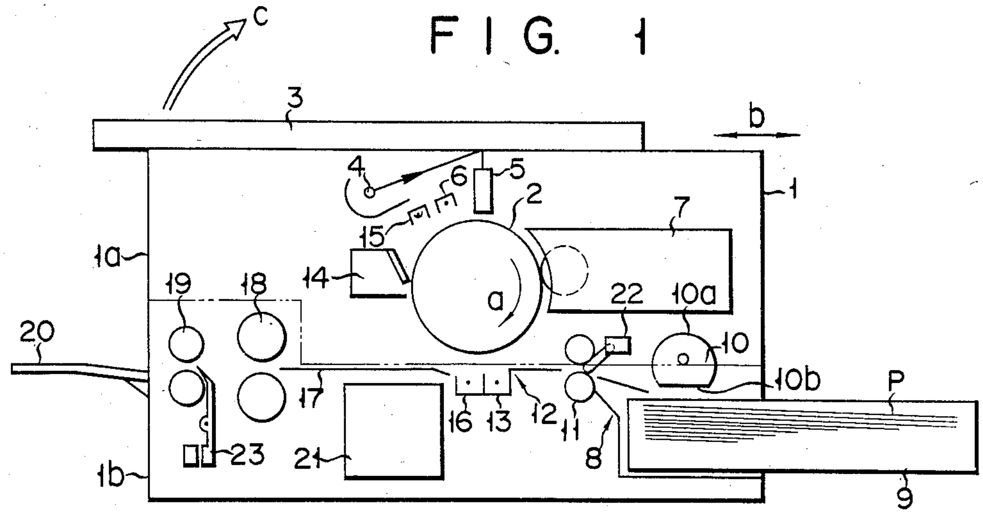
FIG. 1 is a longitudinal sectional front view schematically showing an electronic copying machine according to a first embodiment of the present invention.

FIG. 1 shows the overall configuration of an electronic copying machine as an image forming apparatus according to the first embodiment. Reference numeral 1 denotes a housing of the copying machine. A photosensitive drum 2 is arranged at substantially the center of the housing 1 and rotates in a direction indicated by arrow a. A document table 3 is arranged at the upper portion of the housing 1 to reciprocally support a document (not shown) along b directions. When the document table 3 is driven in synchronism with rotation of the photosensitive drum 2, light emitted from an expose or exposure lamp 4 is reflected by the document placed on the document table 3. The reflected light is focused on the photosensitive drum 2 through a converging light transmission member 5 and an inverted image of the document image is formed on the photosensitive drum 2. In this case, the photosensitive drum 2 has been charged by a charger 6, and the inverted image on the photosensitive drum 2 is formed as a latent image. A toner is applied by a developing unit 7 to this latent image to visualize the image.

An image forming medium feed mechanism (to be referred to as a feed mechanism hereinafter) 8 is arranged below the developing unit 7 to feed a sheet P as an image forming medium to a portion (image transfer portion 12) below the photosensitive drum 2. The feed mechanism 8 comprises a feed cassette (image forming medium storage portion) 9 which is detachably attached to a side portion of the housing 1 and which stores a plurality of sheets P, and a feed roller (image forming medium feed member) 10. A pair of aligning rollers (convey members) 11 are arranged to align the leading end of the sheet P fed by the feed roller 10. The feed roller 10 comprises a semicircular roller which has a contact portion 10a for selectively contacting the uppermost sheet P in the feed cassette 9 and a noncontact portion 10b which does not contact the uppermost sheet P. A solenoid for a spring clutch (to be described later) for feed roller rotation is driven to transmit the driving force of a motor to the feed roller 10, so that the feed roller 10 is rotated through a predetermined angle (e.g., 210 degrees) and is stopped.

The sheet P fed by the aligning rollers 11 is supplied to the image transfer (forming) portion 12. The sheet P fed to the image transfer portion 12 is brought into tight contact with the surface of the photosensitive drum 2. A toner image is transferred from the photosensitive drum 2 to the sheet P since the sheet P is charged by a charger 13. Thereafter, the residual toner is removed by a cleaner 14 from the surface of the photosensitive drum 2. The after image is then removed by a discharge lamp 15, so that the photosensitive drum 2 is restored to its initial state. The sheet P is electrostatically removed by a separation charger 16 from the photosensitive drum 2 and is guided along a feed path 17. When the sheet P passes between a pair of heat rollers 18 which function and as a fixing unit, the image on the sheet P is fixed thereby. The sheet P is then discharged by a pair of feed out rollers 19 into a tray 20 outside the housing 1. The photosensitive drum 2, the document table 3, the developing unit 7, the feed roller 10, the aligning rollers 11, the heat rollers 18 and the feed out rollers 19 are driven by a motor 21.

A switch (referred to as a feed switch hereinafter) 22 is arranged in the vicinity (front) of the aligning rollers 11 to detect the feeding state. A switch (to be referred to as a feed out switch) 23 is arranged in the vicinity (front) of the feed out rollers 19 to detect the discharging state. These switches are primarily arranged to detect paper jam (or simply jam).

The housing 1 is divided into an upper assembly 1a and a lower assembly 1b at a boundary of the feed path 17, as indicated by the alternate long and two short dashed line. The upper and lower assemblies 1a and 1b are pivoted about a shaft (not shown) mounted at one side of each of the upper and lower assemblies. The upper assembly 1a can be pivoted at a predetermined angle along c direction. The upper assembly 1a has the photosensitive drum 2, the document table 3, the expose lamp 4, the converging light transmission member 5, the charger 6, the developing unit 7, the feed roller 10, the upper aligning roller 11, the cleaner 14 and the discharge lamp 15. The lower housing 1b has the feed cassette 9, the lower aligning roller 11, the chargers 13 and 16, the feed path 17, the heat rollers 18, the feed out rollers 19, the tray 20 and the motor 21.

Figure 2:
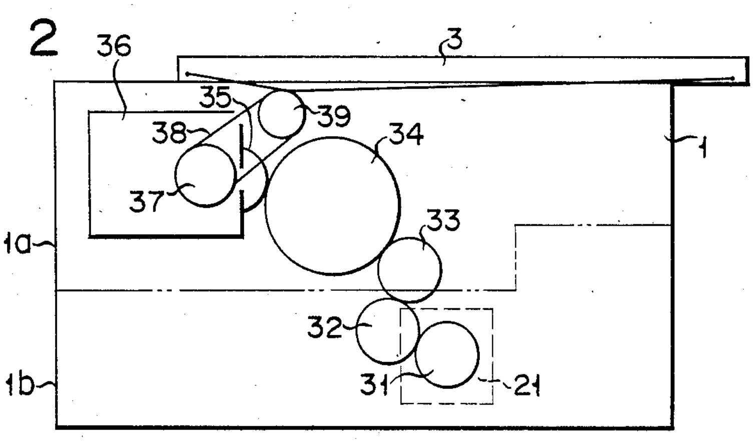
FIG. 2 is a side view showing a document table drive mechanism shown in FIG. 1.

FIG. 2 shows in detail a document table drive mechanism shown in FIG. 1. A driving force of a gear 31 directly coupled to the motor 21 is transmitted to an electromagnetic clutch 36 through driving force transmitting gears 32, 33, 34 and 35. This electromagnetic clutch 26 is switched in response to control signals not to transmit the driving force to a pulley 37, to transmit the driving force in the forward direction, or to transmit the driving force in the reverse direction. The driving force transmitted to the pulley 37 is transmitted to the document table 3 through a wire 38, two ends of which are fixed on the document table 3. The document table 3 is thus moved. A pulley 39 causes the path of the wire 38 to be aligned parallel to the document table 3 so as to prevent the wire 38 from being brought into contact with any other component.

Figure 3:
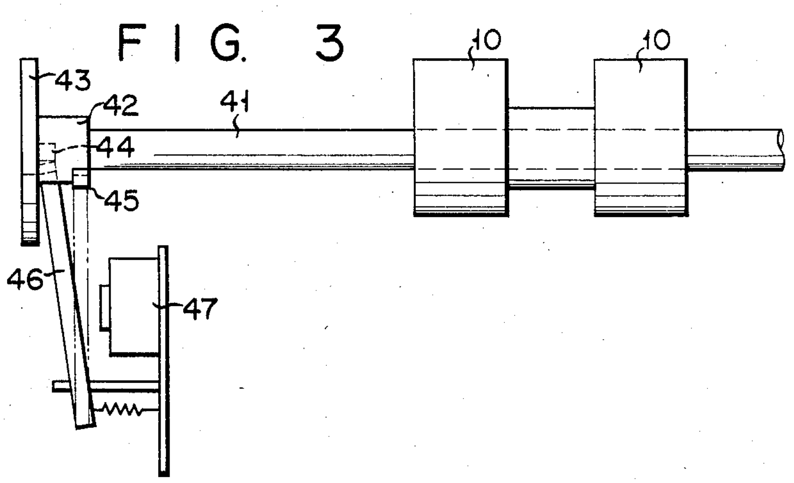
FIG. 3 is a side view showing a feed roller drive mechanism shown in FIG. 1.

FIG. 3 shows a feed roller drive mechanism of FIG. 1. A semicircular feed roller 10 is fixed on a rotating shaft 41. The rotating shaft 41 is fixed on a sleeve 42. The sleeve 42 is coupled by a spring clutch (not shown) to a gear 43 to which the driving force of the motor 21 is transmitted. The driving force of the gear 43 is transmitted to the sleeve 42 also through the spring clutch. Projections 44 and 45 spaced apart by an angular interval of about 210 degrees along the direction of the rotating shaft 41 are formed on the sleeve 42. The driving force of the gear 43 can be transmitted to the sleeve 42 unless the projections 44 and 45 on the sleeve 42 are locked by a lock lever 46. The lock lever 46 is driven by a feed roller solenoid 47. When the solenoid 47 is kept off, the lock lever 46 is engaged with the projection 44, as indicated by the solid line. However, when the solenoid 47 is energized, the lock lever 46 locks with the projection 45, as indicated by the alternate long and two short dashed line.

Figure 4A:
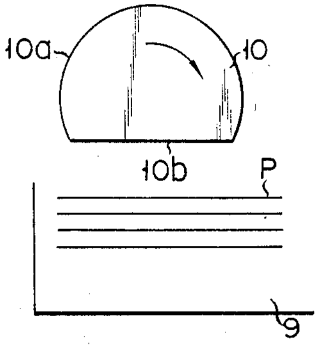
FIGS. 4(a), 4(b), 5(a), (5b), 6(a) and 6(b) are respectively representations for explaining the paper feed operation by the feed mechanism shown in FIG. 1.
Figure 5A:
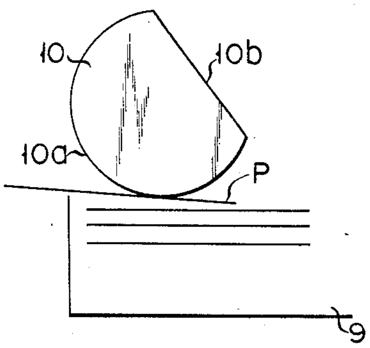
Figure 4B:
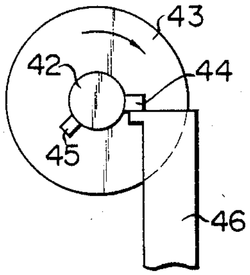
Figure 5B:
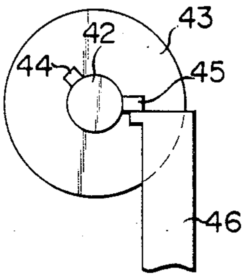
Figure 6A:
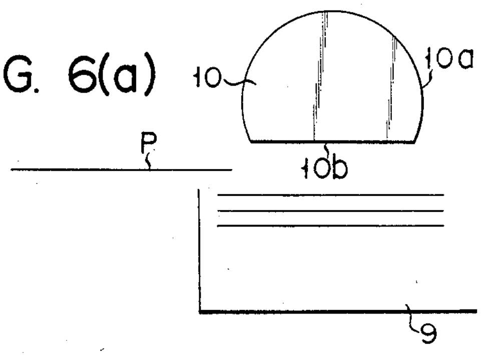
Figure 6B:
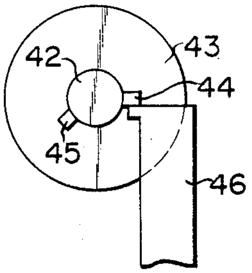

The paper feed operation will be described with reference to FIGS. 4 to 6. In the normal operating state, the feed roller 10 and the drive mechanism are kept at states shown in FIGS. 4(*a*) and 4(*b*). Even if the driving force of the motor 21 is applied in the arrow direction while the solenoid 47 is kept off and the lock lever 46 is engaged with the projection 44, the feed roller 10 will not rotate and is kept in the state of FIG. 4(*a*). In this state, when the solenoid 47 is turned on, the driving force of the motor 21 is transmitted to the sleeve 42. The sleeve 42 is rotated while the projection 45 thereof is kept engaged with the lock lever 46. In this case, the feed roller 10 is also rotated, the uppermost sheet P is fed out from the feed cassette 9, and the state shown in FIG. 5(*a*) is obtained. The feed roller 10 holds the paper sheet P whose trailing end portion is still held in the feed cassette 9. The solenoid 47 is turned off upon rotation of the aligning rollers 11, so that the state shown in FIG. 4(*b*), i.e., FIG. 6(*a*) is restored. The feed roller 10 is driven as if the sheet P is being pushed forward by the roller 10. Therefore, the feed roller 10 is restored to the same state (FIG. 6(*a*)) as in FIG. 4(*a*).

Figure 7:
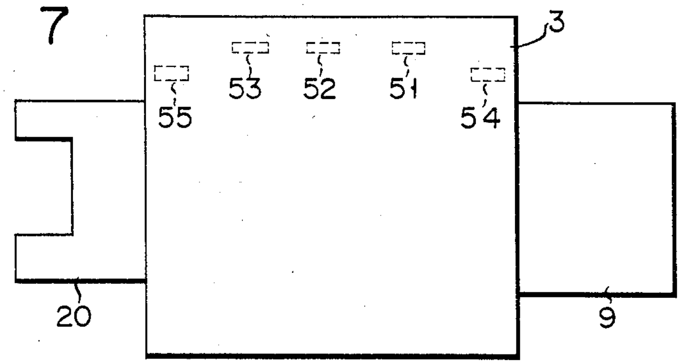
FIGS. 7 to 10 are respectively representations for explaining a document table position detecting mechanism shown in FIG. 1.
Figure 8:
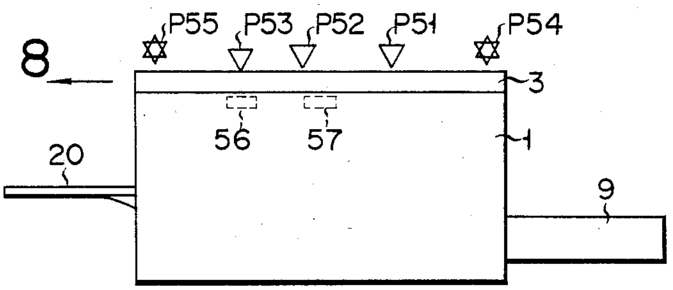

FIGS. 7 to 10 show the operation of the document table position detecting mechanism of FIG. 1. As shown in FIG. 7, the document table 3 has three magnets 51, 52 and 53 aligned linearly at predetermined intervals. Two additional magnets 54 and 55 are arranged linearly but are staggered from the magnets 51 to 53 in the direction perpendicular to the document table feed direction. As shown in FIG. 8, lead switches 56 and 57 are arranged in the housing 1 to selectively detect the magnets 51 to 55. The lead switch 56 detects one of the magnets 51 to 53 which is located above the lead switch 56, and the lead switch 57 detects one of the magnets 54 and 55 which is located above the lead switch 57.

Figure 9:
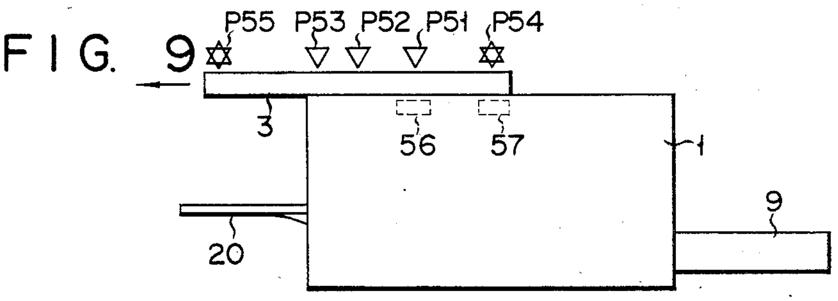
Figure 10:
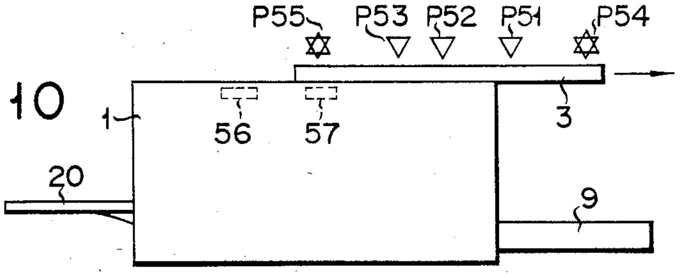

Referring to FIGS. 8 to 10, the magnet detection positions of the magnets 51 to 53 selectively detected by the lead switch 56 are given to be P51, P52 and P53, and the magnet detection positions of the magnets 54 and 55 selectively detected by the lead switch 57 are given to be P54 and P55. FIG. 8 shows the state in which the document table 3 is located in the home position. The home position is defined as a position where the document table 3 is stopped when the copy operation is completed. When the document table 3 is shifted from a stop position (to be referred to as a document table limit position hereinafter) where only the lead switch 57 is turned on upon movement of the magnet 55 located in the arrowed direction (to be referred to as a forward direction hereinafter) in another arrowed direction (to be referred to as a backward direction hereinafter) in FIG. 8, the home position is detected only the lead switch 56 being turned on, that is the lead switch 56 is turned on by the magnet 53. FIG. 9 shows a state wherein the document table 3 is stopped at a backward stop position (to be referred to as a document table start position hereinafter). The document start position is detected when the lead switches 56 and 57 are simultaneously turned on by the magnets 51 and 54. When the document table 3 is moved forward from the document table start position and the lead switch 56 is turned on for the first time (i.e., the lead switch 56 is turned on by the magnet 52), the aligning roller start position is detected. As described above, since the photosensitive drum 2 is driven in synchronism with the document table 3, a timing for rotating the aligning rollers 11 so as to align the leading end of the sheet P with the leading end of the image on the photosensitive drum 2 can be determined not by the photosensitive drum 2 but by the document table 3. The position for starting the aligning rollers is given as the aligning roller start position.

Figure 11:
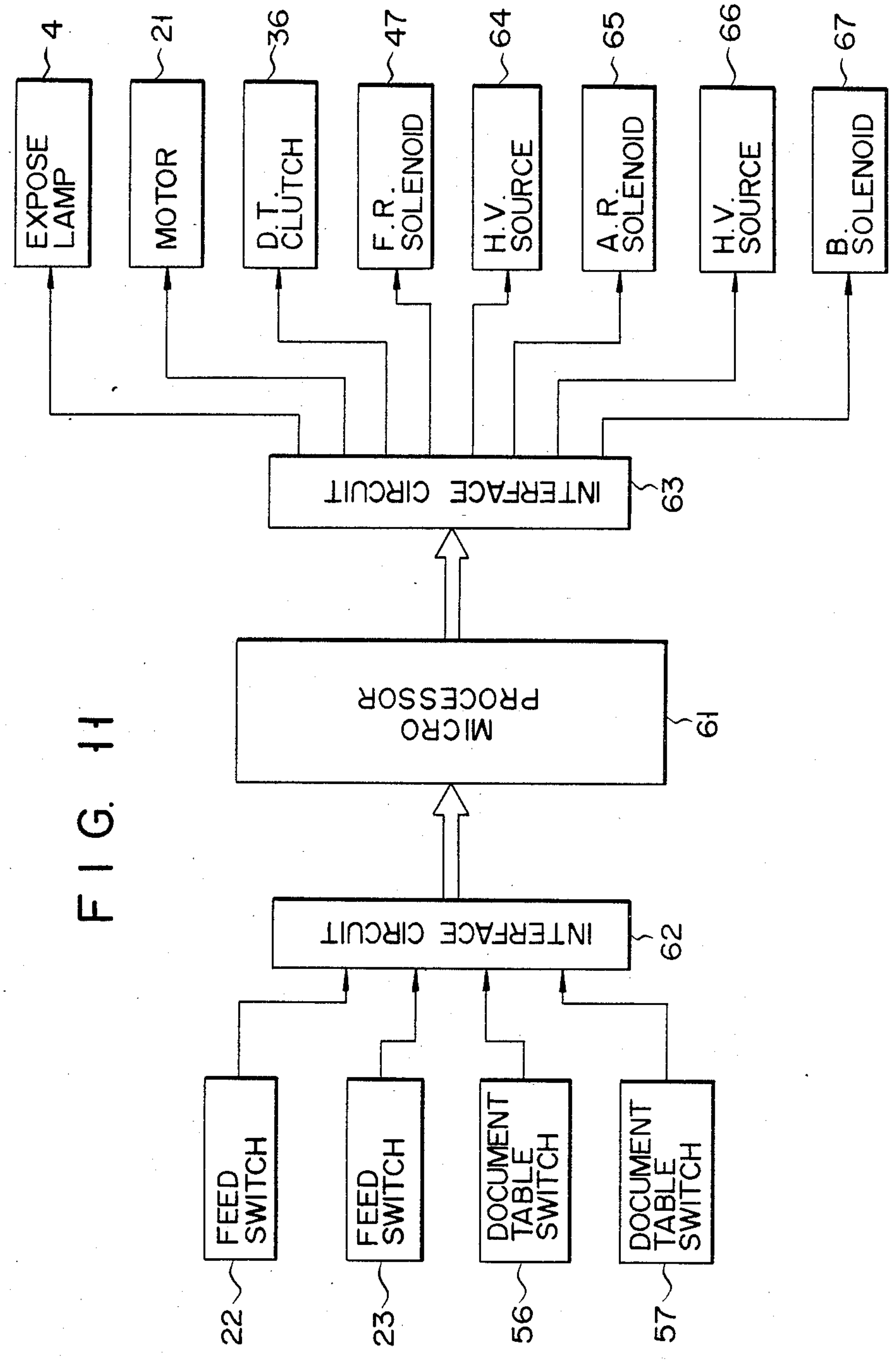
FIG. 11 is a block diagram showing the overall arrangement of a control circuit in the copying machine in FIG. 1.

FIG. 11 shows the overall arrangement of the control circuit in the electronic copying machine according to the first embodiment. Reference numeral 61 denotes a microprocessor as a main control section for controlling the overall operation of the copying machine. The microprocessor 61 receives signals from the feed switch 22, the feed out switch 23, the lead switches (to be referred to as document table switches hereinafter) 56 and 57 and the like through an interface circuit 62. The microprocessor 61 detects and processes the input signals in accordance with the prestored program and supplies various control signals to the respective control devices through an interface circuit 63. The respective control devices include the expose lamp 4, the motor 21, the electromagnetic clutch (to be referred to as a document table clutch hereinafter) 36, the feed roller solenoid 47, a high voltage source 64 for applying a voltage to the charger 6, an aligning roller solenoid 65 for transmitting a driving force to the aligning rollers 11, a high voltage source 66 for applying a voltage to the transfer charger 13 and the separation charger 16, and a blade solenoid 67 for causing the blade of the cleaner 14 to urge against the photosensitive drum 2. These control devices are operated in response to the control signals, respectively.

Figure 12:
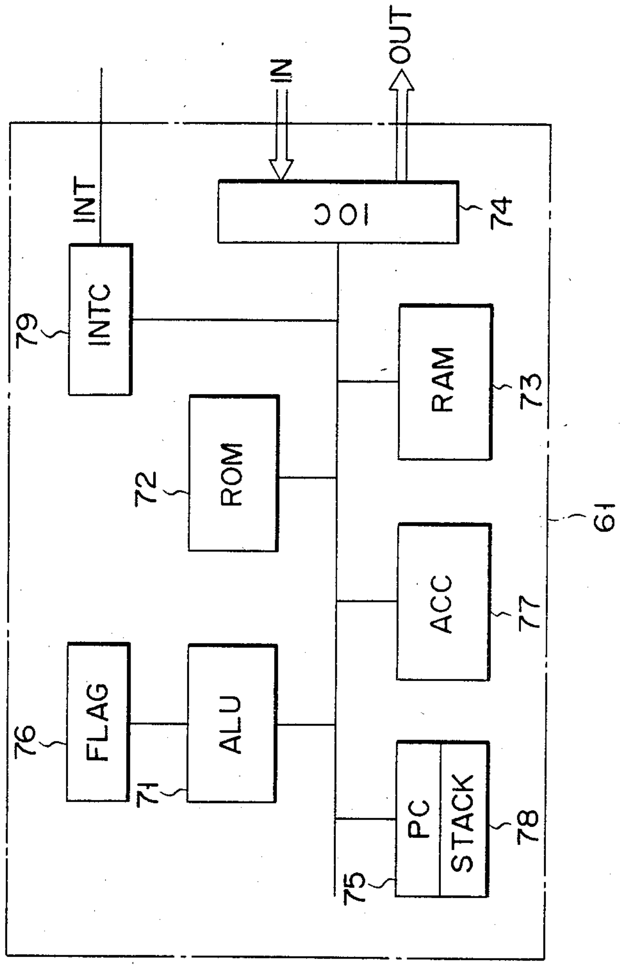
FIG. 12 is a block diagram of a microprocessor shown in FIG. 11.

The microprocessor 61 is arranged as shown in FIG. 12. The microprocessor 61 comprises a one-chip microprocessor having the architecture shown in FIG. 12. Referring to FIG. 12, reference numeral 71 denotes an arithmetic and logic unit (ALU) having an arithmetic and logic function; 72, a read-only memory (ROM) for prestoring the processing program; 73, a random access memory (RAM) for storing processed data; 74, an input/output port and input/output controller (IOC) for exchanging signals between the microprocessor 61 and external devices; 75, a program counter (PC); 76, a flag (FLAG); 77, an accumulator (ACC); 78, a stack register (STACK); and 79, an interrupt controller (INTC).

The operation of the microprocessor 61 will be briefly described. An address for the processing program stored in the ROM 72 is accessed by the PC 75. An instruction read out from the ROM 72 is decoded, and a decoded instruction is executed. The FLAG 76 stores data representing a carry or a borrow as a result of an arithmetic operation. The arithmetic operation result is stored in the RAM 73 through the ACC 77 with or without an instruction. The STACK 78 is used to specify the address location of a subroutine, and stores a return address of the main routine and the contents of the PC 75 in the interrupt mode. When the INTC 79 receives an internal interrupt request or an interrupt signal from an external terminal (INT), the main routine is interrupted, and the interrupt subroutine is started. When the interrupt operation is started, the contents of the PC 75 are stored in the STACK 78, and the specific start address for the interrupt operation is accessed. When the interrupt operation is completed, the return address of the main program is accessed.

Figure 13:
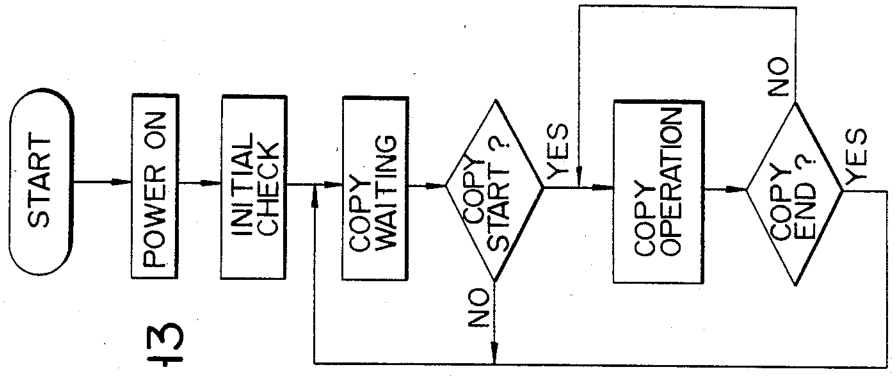
FIG. 13 is a general flow chart for explaining the operation of the control circuit (of FIG. 11) in the copying machine.

FIG. 13 is a general flow chart of the electronic copying machine described above. An initial check is a routine to check whether or not the copy ready mode is set. For example, the microprocessor 61 checks whether or not the heat rollers 18 are heated to a fixing temperature. When the initial check is completed and the copying machine is set in the copy ready mode, the copy waiting routine is executed. This routine is started by setting a preset copy number and is ended by depression of the copy button. When the copy operation is started, the copy processes consisting of charging, exposure, transfer, discharging and fixing are sequentially performed. Until the copied sheet number reaches the preset copy number, the copy cycle is repeated. During the copy operation, errors such as jamming are continuously checked for.

Figure 14A:
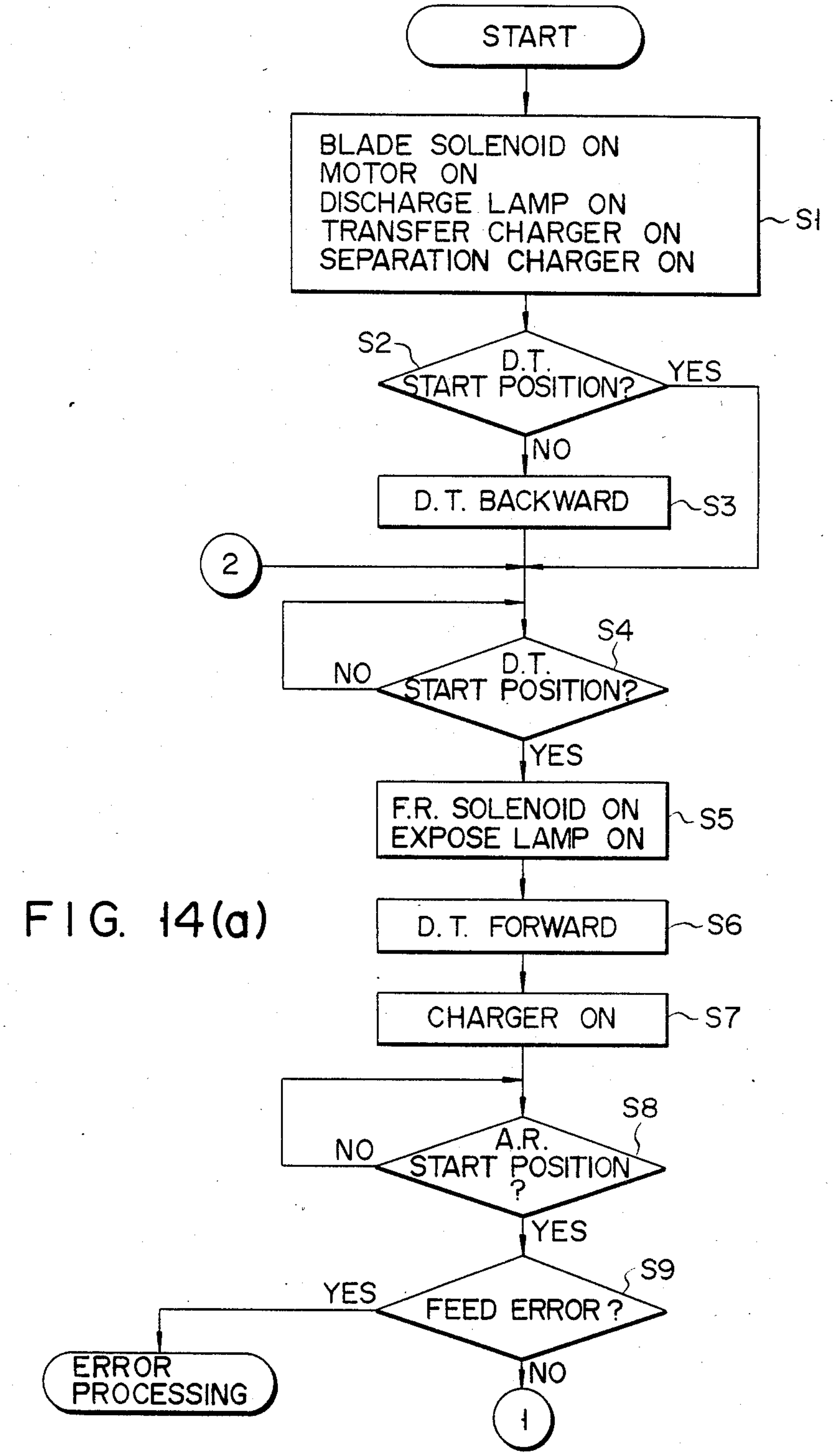
FIGS. 14(a) and 14(b) are a flow chart for explaining the copy operation.
Figure 14B:
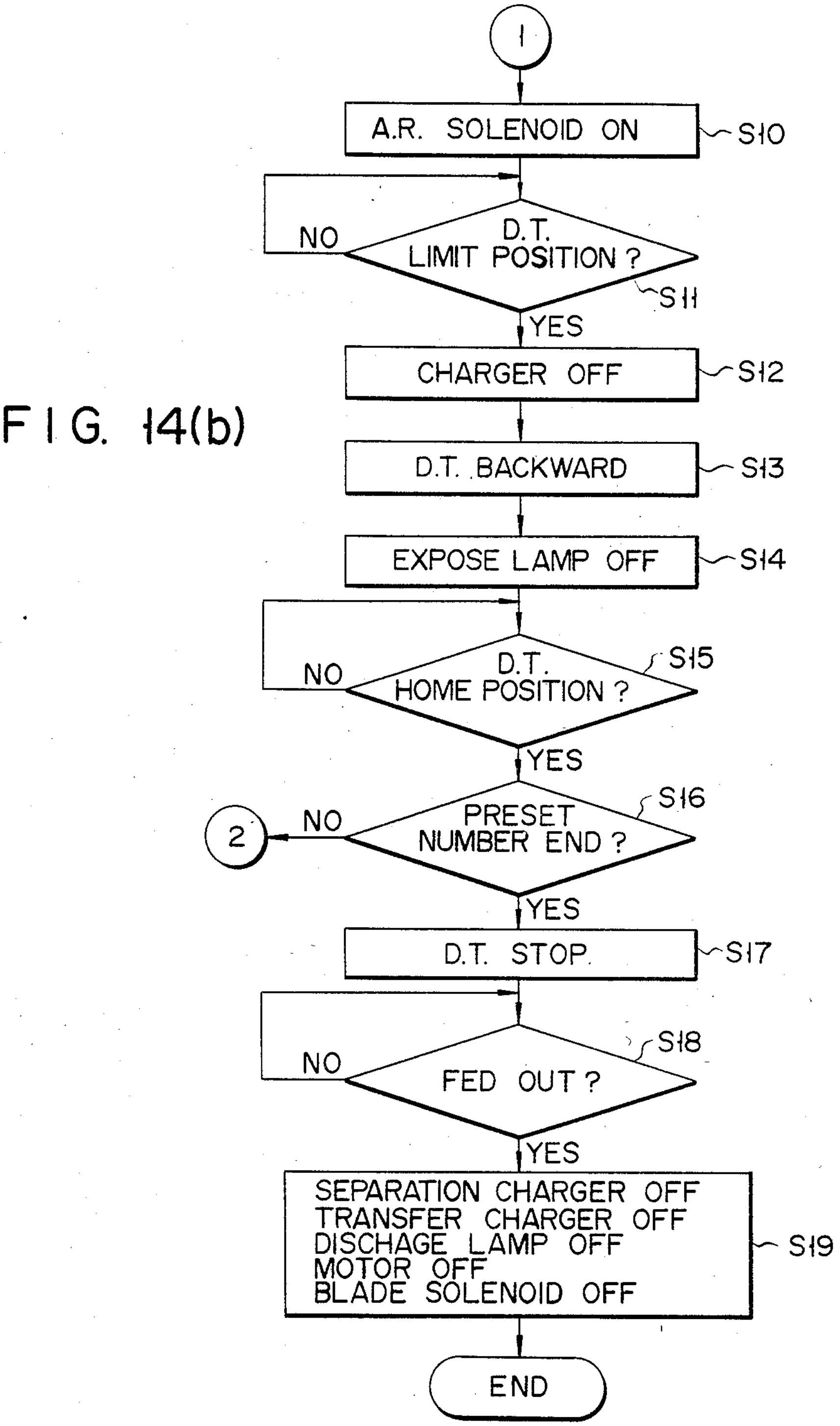

The copy control operation will be described with reference to the flow chart in FIG. 14. When the copy operation is started, the flow advances to step S1. In step S1, the blade solenoid 67, the motor 21, the discharge lamp 15 and the high voltage source 66 (for the chargers 13 and 16) are turned on, and the flow advances to step S2. The microprocessor checks in step S2 whether or not the document table 3 is located in the start position in accordance with the signals from the document table switches 56 and 57. If NO in step S2, the flow advances to step S3. The microprocessor supplies a control signal to the document table clutch 36 to move the document table 3 backward, and the flow advances to step S4. However, if YES in step S2, the flow jumps to step S4. In step S4, the document table 3 is moved until it reaches the document table start position. In this position, the document table switches 56 and 57 are simultaneously turned on to detect the document table start position, and the flow advances to step S5. In step S5, the microprocessor supplies a control signal to the feed roller solenoid 47 to rotate the feed roller 10. At the same time, the microprocessor causes the expose lamp 4 to be turned on. The flow then advances to step S6. In step S6, the microprocessor supplies a control signal to the document table clutch 36 to move the document table forward, and the flow advances to step S7. In step S7, the high voltage source 64 (for the charger 6) is turned on, and the flow advances to step S8. In step S8, the microprocessor checks that the aligning roller start position is set, and the flow advances to step S9. The microprocessor checks in step S9 whether or not a feeding error has occurred in accordance with the ON/OFF state of the feed switch 22. When the microprocessor detects that the feed switch 22 is kept off while the aligning roller start position, is detected, the aligning rollers 11 must not be rotated. If the aligning rollers 11 are rotated, the leading end of the sheet is not aligned with that of the image formed on the photosensitive drum 2, and a feed error occurs. If YES in step S9, error processing is performed. However, if NO in step S9, the flow advances to step S10. In step S10, the microcomputer checks whether or not the document table 3 has reached the document table limit position detected when only the document table switch 57 is turned on. If YES in step S11, the flow advances to step S12. In step S12, the high voltage source 64 is turned off, and the flow advances to step S13. In step S13, the microprocessor supplies a control signal to the document table clutch 36 to move the document table 3 backward, and the flow advances to step S14. In step S14, the expose lamp 4 is turned on, and the flow advances to step S15. The microprocessor checks in step S15 whether or not the document table 3 is moved in the home position detected by the document table switch 56. If YES in step 15, the flow advances to step S16. The microcomputer checks in step S16 whether or not the copied sheet number has reached the preset copy number. If NO in step S16, the flow returns to step S4, and the copy operation is repeated. However, if YES in step S16, the flow advances to step S17. In step S17, the microprocessor supplies a control signal to the document table clutch 36 to stop the document table 3 in the home position, and the flow advances to step S18. The microprocessor checks in step S18 whether or not the sheet P has been discharged in accordance with the signal from the feed out switch 23. If YES in step S18, the flow advances to step S19. In step S19, the high voltage source 66, the discharge lamp 15, the motor 21 and the blade solenoid 67 are turned off, and the copy operation is ended. The copying machine is then set in the copy waiting state in FIG. 13.

The interrupt operation of the copying machine is performed by using an internal interrupt request generated within the microprocessor 61. This interrupt processing is preset to be repeatedly performed at every predetermined period. This interrupt processing will be described with reference to FIG. 15. A main program among the programs stored in the ROM 72 is executed upon energization of the copying machine. When the INTC 79 is set to generate an internal interrupt every 12 msec after the copy operation is started, the main program is temporarily interrupted after a lapse of 12 msec since the copy operation was started. When the interrupt program is completed, the main program is accessed again. In addition, when a period of 12 msec has elapsed, i.e., when a period of 24 msec has elapsed since the copy operation was started, the interrupt program is executed.

As described with reference to FIG. 13, errors such as paper jamming are checked for by the microprocessor 61 during the copy operation. Paper jam detection will be described hereinafter. The paper jam check is performed by an interrupt program which is repeatedly executed at every predetermined period. The paper jam detection will be described with reference to the flow chart in FIGS. 16(*a*) and 16(*b*).

Steps S1 to S4, S5 to S8 and S9 to S11 perform different types of paper jam detection, respectively. Steps S1 to S4 check for an error of a type wherein the feed switch 22 is not turned on within a predetermined time T1 after the aligning rollers 11 are rotated to feed the sheet P. More particularly, when an interrupt period is given to be t, and the microprocessor detects in step S2 that the aligning roller solenoid 65 is kept on after the ON operation of the feed switch 22 is detected in step S1, a timer set in the RAM 73 is incremented by one (the initial value of the timer is zero) in step S3. Since the interrupt is generated at every interrupt period t, a given address of the RAM 73 can serve as a timer. The microprocessor checks in step S4 whether or not the count of the timer exceeds T1/t. If YES in step S4, i.e., when the feed switch 22 is kept on for over the time T1 after the aligning rollers 11 are rotated, error processing is executed. Steps 5 to 8 represent an error check of a type wherein the leading end of the sheet P is not detected by the feed out switch 23 within a predetermined time T2 after the aligning rollers 11 are rotated to feed the sheet P. For example, the sheet P is not properly separated from the photosensitive drum 2, or the sheet P is not properly supplied to the heat rollers 18. More particularly, a timer set in the RAM 73 monitors the ON operation of the feed out switch 23 in step S6 after the aligning roller solenoid 65 is turned on in step S5 in the same manner as in steps S1 to S4. The microcomputer checks in step S8 whether or not the count of the timer exceeds T2/t. If YES in step S8, error processing is executed. Steps S9 to S11 represent an error check of a type wherein the feed out switch 23 is not turned off within a predetermined time T3 after it was turned on, i.e., jamming has occurred in the vicinity of the feed out switch 23 and the sheet cannot be discharged. More particularly, when steps S5 to S8 are properly executed, the feed out switch 23 is turned on. The microprocessor detects in step S9 that the feed out switch 23 is turned on, a timer set in the RAM 73 monitors the ON time of the feed out switch 23 in the same manner as in steps S1 to S4. The microprocessor checks in step S11 whether or not the count of the timer exceeds T3/t. If YES in step S11, error processing is performed.

Figure 17:
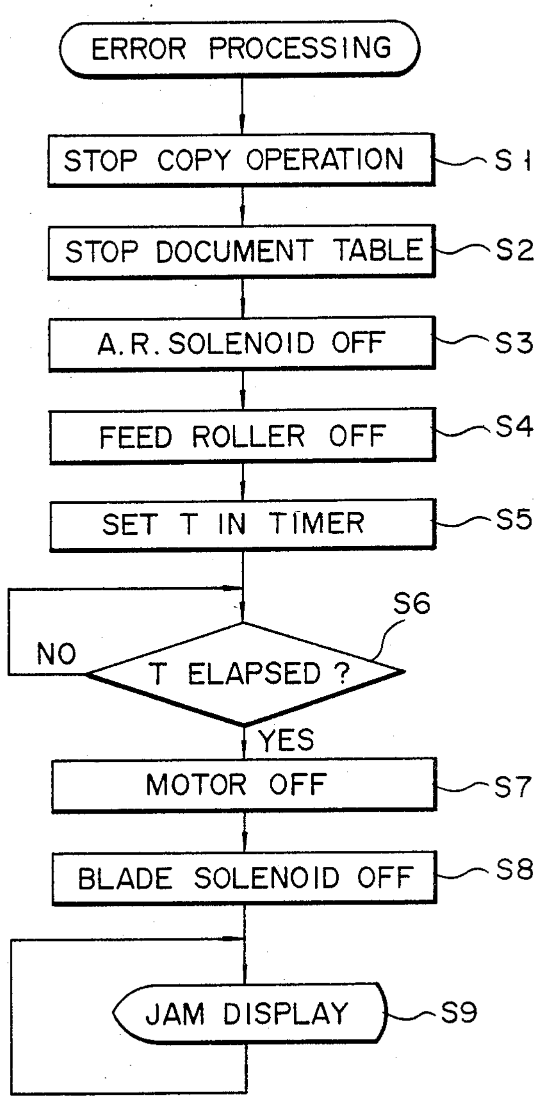
FIG. 17 is a flow chart for explaining error processing.

Error processing will be described with reference to the flow chart in FIG. 17. In step S1, the copy processes such as charging, exposure, transfer and separation are interrupted in step S1. In step S2, the microprocessor supplies a control signal to the document table clutch 36 to stop the document table 3. In step S3, the aligning roller solenoid 65 is deenergized to stop the aligning rollers 11. In step S4, the feed roller solenoid 47 is deenergized to engage the lock lever 46 with the projection 44. In step S5, a time T after which the feed roller 10 should be located in the position shown in FIG. 4 is set in the same timer as in the paper jam detection. In step S6, the copying machine is set in the waiting mode when the time T has elapsed. In step S7, the motor 21 as the drive source for the feed roller 10 is stopped. In this case, the feed roller 10 should be set in the position shown in FIG. 4. In step S8, the blade solenoid 67 is turned off to separate the blade of the cleaner 14 from the photosensitive drum 2. Jam display is performed in step S9, and all other functions are disabled.

In this manner, when an error such as paper jamming occurs, the feed roller 10 is rotated such that the contact portion 10*a* thereof is separated from the sheet P. In other words, the feed roller 10 is rotated and set in the initial position (the position shown in FIG. 4) upon system energization. Thereafter, all functions other than the paper jam display function are disabled. When the jammed sheet P is removed, the feed roller 10 will not interfere with the removal of the jammed sheet P. In addition, the feed roller will not interfere with the removal of the paper cassette 9. Unlike the conventional copying machine, the motor or the like need not be uselessly driven in the normal condition.

In the above embodiment, the feed roller as the sheet feeding means comprises a semicircular roller. However, the feed roller may comprise any other noncircular roller. The feeding means is not limited to the roller but can be an endless belt. It is essential that the sheet feeding means has a contact portion and a noncontact portion with respect to the sheet in the sheet storage portion.

According to the first embodiment, the present invention is applied to an electronic copying machine. However, the present invention is not limited to a copying machine but may also be applied to any image forming apparatus (e.g., a facsimile system, a printing press or a color copying machine) having the above-mentioned sheet feeding means.

According to the first embodiment, the sheet feeding means for feeding out a sheet from the sheet storage portion will not interfere with correction of the failure. The respective mechanisms need not be driven uselessly in the normal condition.

A second embodiment of the present invention will be described with reference to FIGS. 18 to 27.

Figure 18:
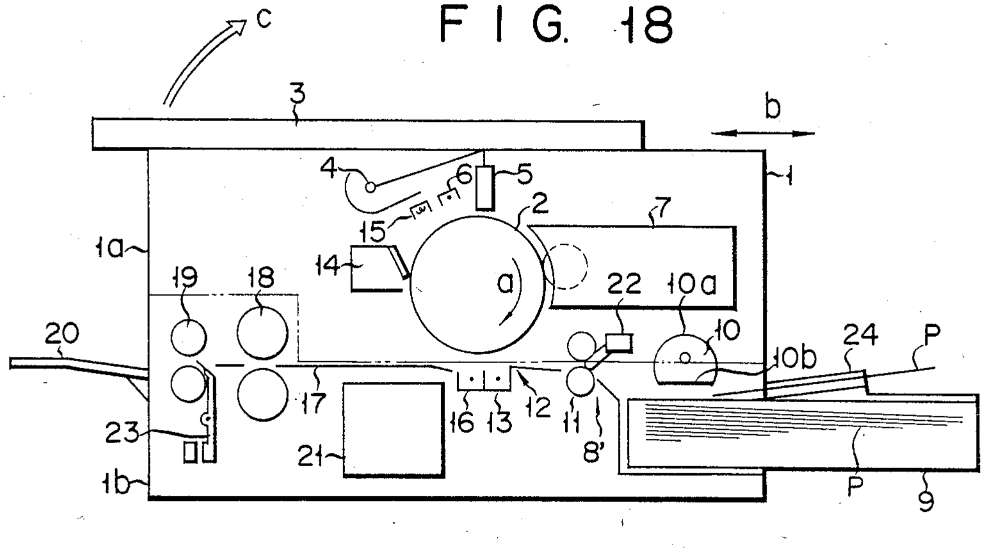
FIG. 18 is a longitudinal sectional front view schematically showing an electronic copying machine according to a second embodiment of the present invention.

FIG. 18 shows the overall configuration of an electronic copying machine according to the second embodiment of the present invention which is substantially the same as that of FIG. 1. The same reference numerals in FIG. 18 denote the same parts as in FIG. 1, and a detailed description thereof will be omitted. Differences between the first and second embodiments lie in the fact that a manual feed plate 24 is disposed above the feed cassette 9 to manually feed the sheet P as indicated by the alternate long and short dashed line, and that the arrangement of a sheet feed mechanism 8' in the second embodiment is different from that in the first embodiment. Therefore, a document table drive mechanism and a document table position detection mechanism, as shown in FIG. 18, are the same as those in FIGS. 2, 7 to 10 in the first embodiment.

Figure 19:
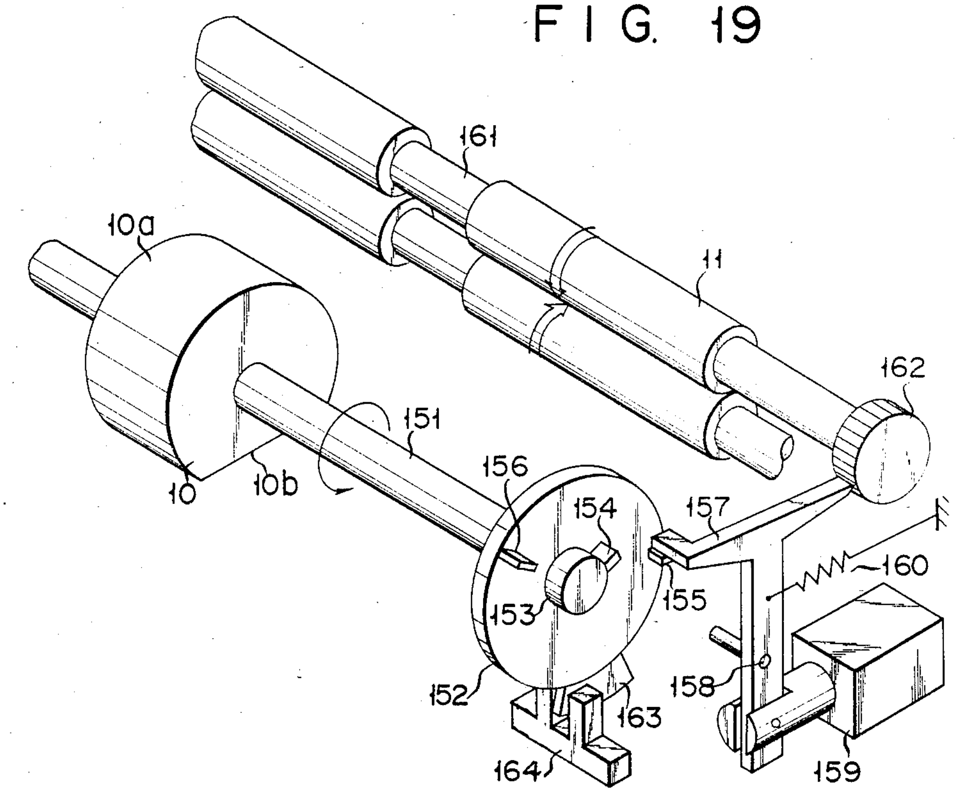
FIG. 19 is a perspective view showing the main part of a feed mechanism of FIG. 18.

FIG. 19 shows the feed mechanism 8'. A semicircular feed roller 10 is mounted on a rotating shaft 151, and a sleeve 152 is mounted on the rotating shaft 151. The sleeve 152 is coupled to a transmission mechanism (not shown) to which the driving force of the motor 21 is transmitted through a spring clutch 153, so that the driving force of the motor 21 is transmitted to the rotating shaft 151 through the spring clutch 153 and the sleeve 152. A projection 154 is formed on the inner surface of the sleeve 152, and projections 155 and 156 are formed on the outer surface of the sleeve 152 at a predetermined angular interval. One end of a lock lever (control lever) 157 can be selectively engaged with the projections 154 to 156. When the lock lever 157 is selectively engaged with one of the projections 154 to 156, the driving force from the motor 21 is not transmitted to the rotating shaft 151. More particularly, the lock lever 157 comprises a substantially T-shaped member and can be pivoted about a shaft 158. The lock lever 157 is driven by a solenoid (to be referred to as a feed solenoid hereinafter) 159. When the feed solenoid 159 is deenergized, the lock lever 157 is biased by a coil spring 160 to engage with the projections 155 and 156 on the sleeve 152. However, when the feed solenoid 159 is energized, the lock lever 157 is biased against the tension force of the coil spring 160 to engage with the projection 154 on the sleeve 152.

Aligning rollers 11 are mounted on rotating shafts 161, respectively. One of the rotating shafts 161 is coupled to a transmission machanism (not shown) to which the driving force of the motor 21 is transmitted through a spring clutch 162, so that the driving force of the motor 21 is transmitted to the rotating shaft 161 through the spring clutch 162. The spring clutch 162 is engaged with the other end of the lock lever 157 when the feed solenoid 159 is kept off. In other words, when the feed solenoid 159 is deenergized, the spring clutch 162 is locked by the lock lever 157, so the driving force of the motor 21 is not transmitted to the rotating shafts 161. However, when the feed solenoid 159 is turned on, the spring clutch 162 is released from the lock lever 157, so that the driving force of the motor 21 is transmitted to the rotating shafts 161, and the aligning rollers 11 are rotated in the direction indicated by the arrow.

Referring to FIG. 19, reference numeral 163 denotes a detection piece for detecting an angle of the sleeve 152. The detection piece 163 is attached at a predetermined position on the outer surface of the sleeve 152. A detector 164 is arranged to detect this detection piece 163. The detector 164 optically detects the detection piece 163 and comprises, for example, a photointerrupter. The angular range detected by the detection piece 163 covers a region from a nearest point where the projection 154 on the sleeve 152 can be engaged with the lock lever 157 without rotating the sleeve 152 by one revolution when the driving force is transmitted to the spring clutch 153 and the feed solenoid 159 is energized, to a point where the lock lever 157 is engaged with the projection 155.

Figure 20:
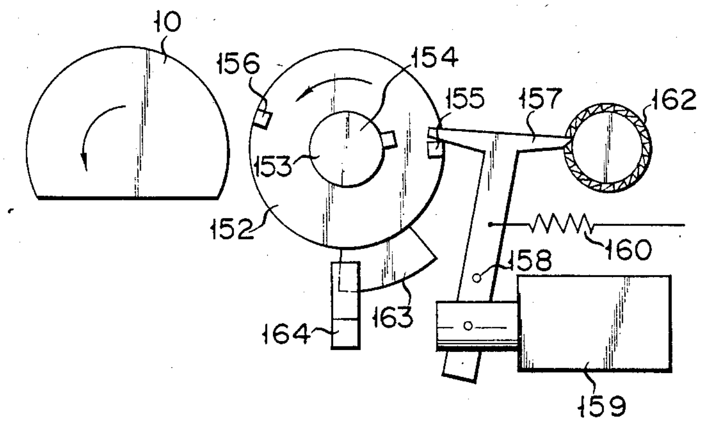
FIGS. 20 to 23 are respectively representations for explaining the feed operation by the main part shown in FIG. 19.
Figure 21:
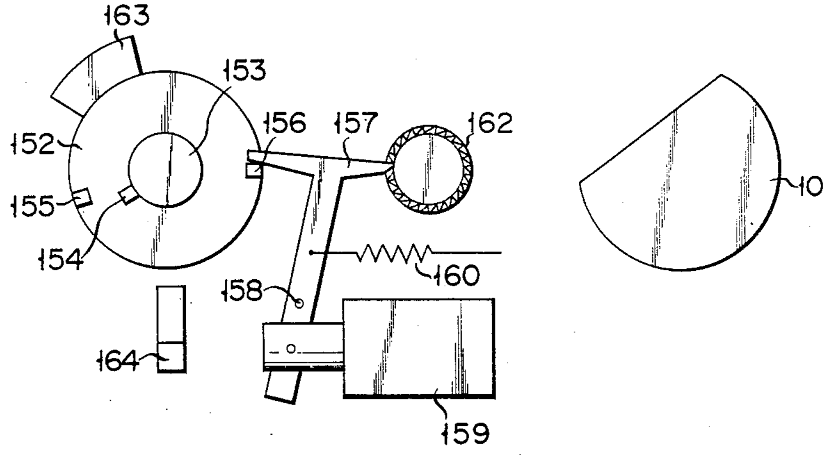
Figure 22:
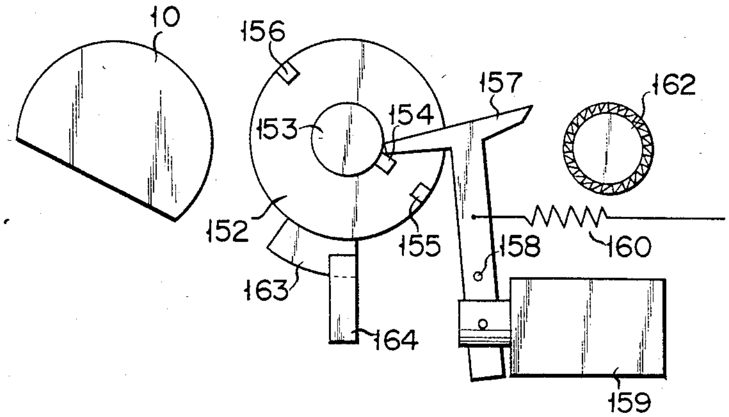
Figure 23:
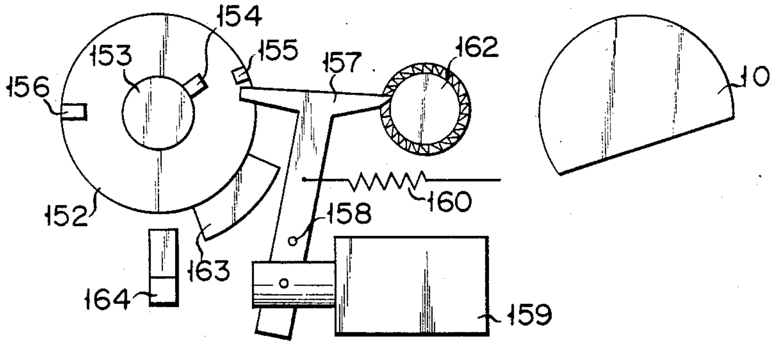

According to the construction described above, the operation of the feed roller 10 and the aligning rollers 11 upon actuation of the lock lever 157 will be described with reference to FIGS. 20 to 23. The feed roller 10 is coaxial with the sleeve 152 in practice, but is misaligned from the sleeve 152 for illustrative convenience. FIG. 20 shows a state wherein the feed roller 10 is located in the reference position. More particularly, the feed solenoid 159 is deenergized, and the lock lever 157 is pulled by the spring 160 and is pivoted about the shaft 158. In this state, the lock lever 157 is engaged with the projection 155 and will not rotate in the direction indicated by the arrow. The detection piece 163 is located at a limit angle at which the detector 164 can detect the piece 163. At the same time, the spring clutch 162 is also stopped by the lock lever 157, so that the aligning rollers 11 are stopped. In this state, when the feed solenoid 159 is energized to disengage the lock lever 157 from the projection 155, and the sleeve 152 is rotated to disable detection of the detection piece 163 by means of the detector 164, the feed solenoid 159 is deenergized again. This state is illustrated in FIG. 23. The sleeve 152 is further rotated to obtain the state shown in FIG. 20. In this case, the feed roller 10 is also rotated to an angle shown in FIG. 20, so that the sheet P abuts against the aligning rollers 11 which are engaged with the lock lever 157 and which are not rotated. When the aligning roller start position is detected and the feed solenoid 159 is energized, the lock lever 157 is disengaged from the spring clutch 162. The aligning rollers 11 are rotated to feed the sheet P such that the leading end thereof is aligned with that of the toner image on the photosensitive drum 2. In this case, the lock lever 157 is released from the projection 156, so that the feed roller 10 is rotated. The sheet P can be pushed by the feed roller 10, thereby properly feeding the sheet P. As shown in FIG. 21, the lock lever 157 is locked by the projection 154 located at an angle such that the sheet P will not be held by the feed cassette 9 or the sheet P in the feed cassette 9 and the feed roller 10. In this case, the aligning rollers 11 are continuously rotated.

The above operation is performed for automatic feeding. However, in the case of manual feeding, the leading end of the sheet P abuts against the aligning rollers 11 at the beginning of the copy operation. Therefore, the state shown in FIG. 20 is kept unchanged until the aligning roller start position is detected. When the aligning rollers are the aligning roller start position is detected, the solenoid 159 is energized to push the sheet P forward, thereby obtaining the state shown in FIG. 22.

The feed switch 22 is turned off at a time when the trailing end of the sheet P passes through the aligning rollers 11. At this moment, the feed solenoid 159 is turned off and is returned to the reference position shown in FIG. 20. The copying machine is then ready for the next copy operation.

FIG. 23 shows a state wherein the detector 164 cannot detect the detection piece 163 when the lock lever 157 passes beyond the projection 155. When the power is cut off during the copy operation, the state shown in FIG. 23 is obtained.

Figure 24:
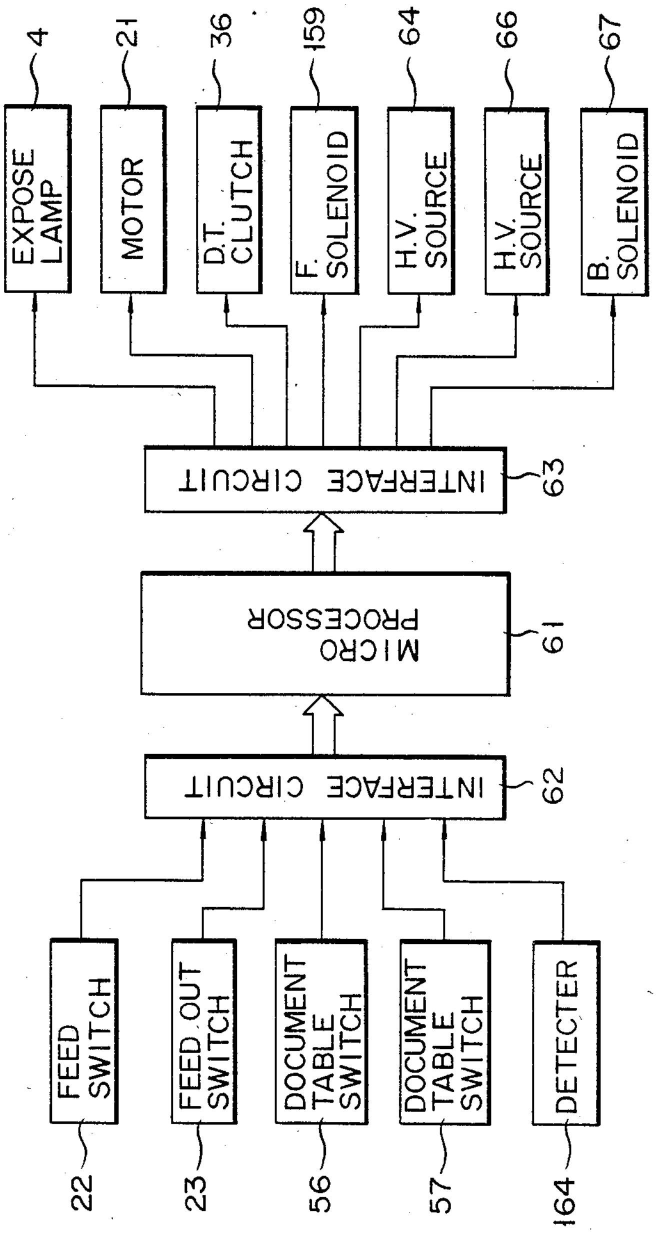
FIG. 24 is a block diagram showing the overall arrangement of a control circuit in the copying machine shown in FIG. 18.

FIG. 24 schematically shows a control circuit which is employed in the electronic copying machine according to the second embodiment. The same parts in FIG. 24 of the second embodiment are designated by the same reference numerals as in FIG. 11 of the first embodiment, and a detailed description thereof will be omitted. Referring to FIG. 24, the detector 164 is connected to an interface circuit 62. A single feed solenoid 159 is connected to an interface circuit 63, in place of the feed solenoid 47 and the aligning roller solenoid 65 shown in FIG. 11. The operation of the microprocessor 61 in the control circuit in the first embodiment, as shown in FIG. 12, can also be applied to the second embodiment.

Figure 25A:
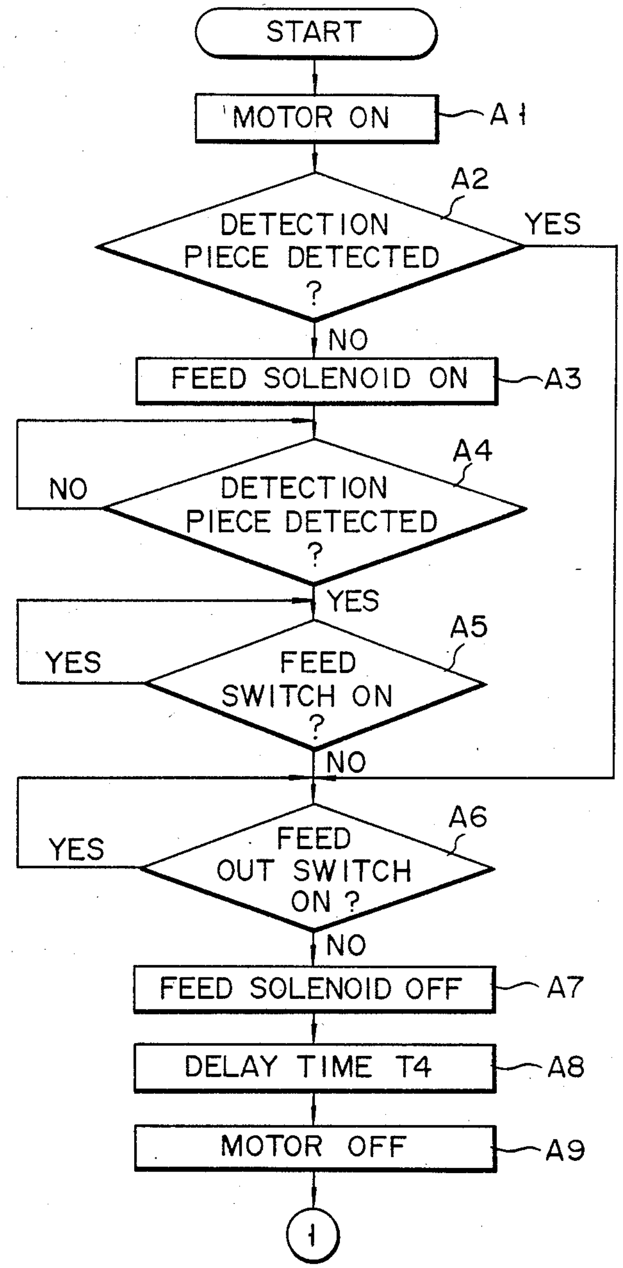
FIGS. 25(a) and 25(b) are respectively a control flow chart at the time of system energization and a general flow chart of copy operation.
Figure 25B:
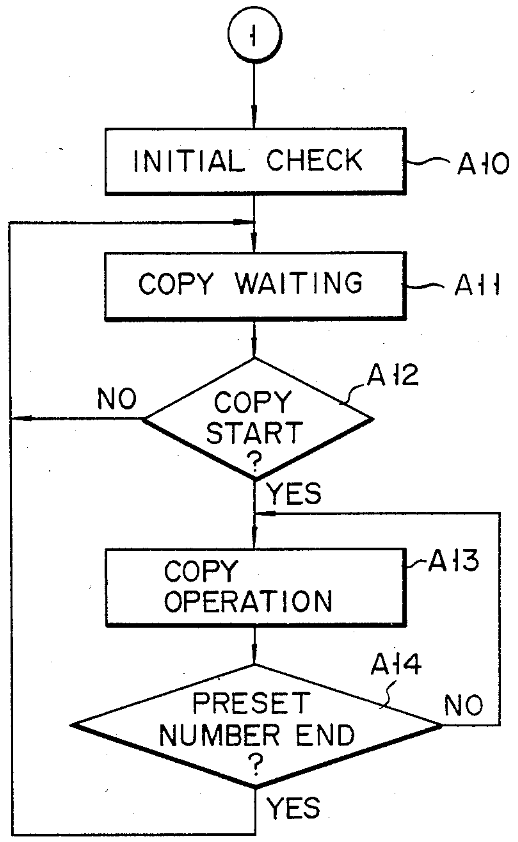

FIGS. 25(*a*) and 25(*b*) are respectively a control flow chart at the time of energization of the feed mechanism 8' and a general flow chart of the copying operation. In the normal state at the time of energization, the feed roller 10 should be located in the reference position shown in FIG. 20. When the copying machine is deenergized during the copy operation, the state shown in FIG. 23 may be obtained. Therefore, when power is supplied to the copying machine, the feed roller 10 must usually be set in the reference position. This control flow is given by steps A1 to A9 in FIG. 25(*a*). In step A1, the motor 21 as the drive source for the feed roller 10 is started. The control sequence changes in accordance with the detection for determining whether or not the detector 164 detects the detection piece 163. The microprocessor checks in step A2 whether or not the detection piece 163 is detected. Assume that the microprocessor determines that the detection piece 163 is detected. When the feed solenoid 159 is energized, the lock lever 157 must be rotated by substantially one revolution to engage with the projection 154. In this case, the feed roller 10 may be rotated by one revolution to feed the sheet P. In order to prevent this, the flow jumps to step A6. When the sheet P is not fed out even if the feed out switch 23 is turned on, the motor 21 is rotated until the sheet P is fed out. Step A7 can be omitted since the feed solenoid 159 is kept off. Step A8 is executed to cause the feed roller 10 to properly return to the reference position of FIG. 20 in such a manner that the motor 21 is rotated, during a time T4 required for engaging the lock lever 157 with the projection 155 when the detection piece 163 is located at the limit angle for causing the detector 164 to detect the detection piece 163, even if the feed out switch 23 is turned on. The motor 21 is stopped in step A9.

However, assume that the detector 164 does not detect the detection piece 163. In this case, the state shown in FIG. 23 is often obtained. The lock lever 157 will not be engaged with the projection 155 even if the motor 21 is rotated. In step A3, the feed solenoid 159 is energized. The feed roller is rotated until the detector 164 detects the detection piece 163 in step A4. When the detector 164 detects the detection piece 163, the state shown in FIG. 22 is obtained. In this case, even if the feed solenoid 159 is deenergized, the lock lever 157 is locked with the projection 155. In addition, when the feed solenoid 159 is kept on, the aligning rollers 11 are rotated, and the feed switch 22 is turned on. When the sheet P is present at a position of the aligning rollers 11, the motor 21 is kept on in step A5 until the feed switch 22 is turned off. The motor 21 is further driven to feed out the sheet P in step A6. The subsequent operation is the same as described above.

The initial check in step A10 in FIG. 25(*b*) comprises a routine for determining whether or not the copy ready mode is set. For example, the microprocessor checks whether or not the heat rollers 18 are heated to a fixing temperature. When the initial check is completed and the microprocessor detects that the copying machine is ready for copy operation, a copy waiting routine in step A11 is set. This routine is started by selection of the preset copy number and ended by depression of the copy button. When the microprocessor detects in step A12 that the copy button is depressed, the flow advances to step A13. In step A13, the copy processes such as charging, exposure, transfer, discharging and fixing are sequentially performed. The copy cycle is repeated until the copied sheet number reaches the preset copy number in step A14. An error such as paper jamming is also checked for during the copy operation.

Figure 26A:
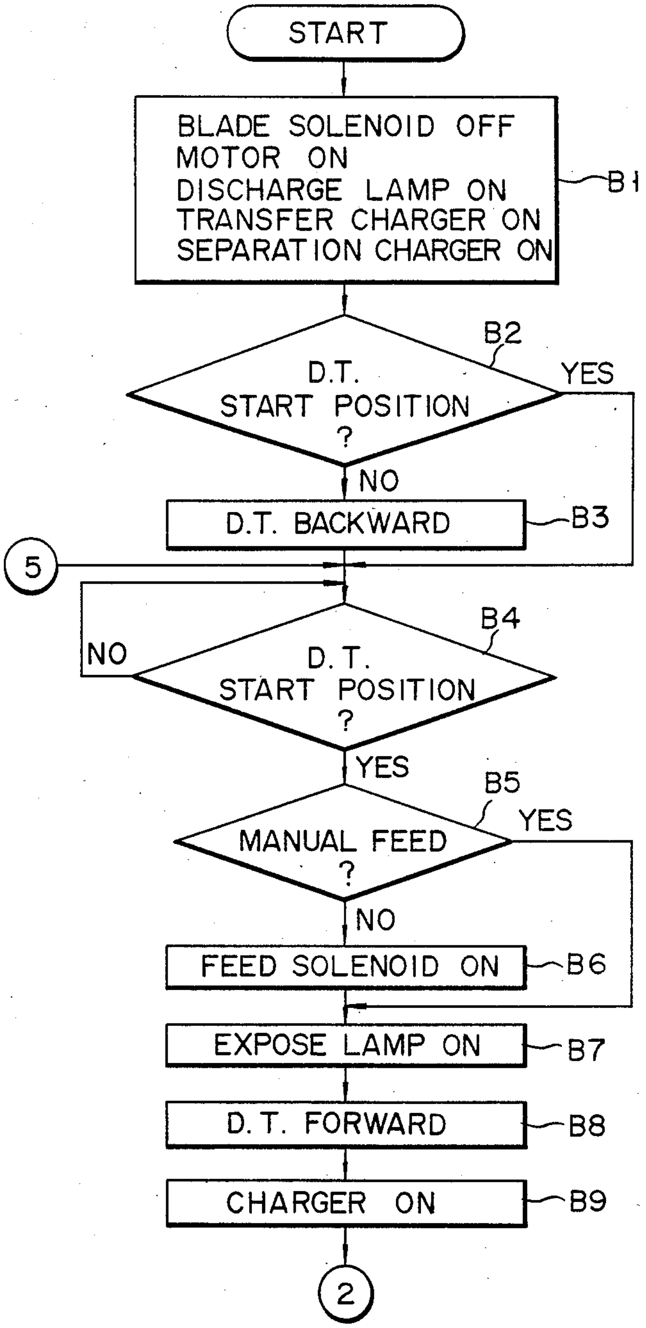
FIGS. 26(a) to 26(c) are respectively control flow charts for explaining the copy operation in the copying machine in FIG. 18.
Figure 26B:
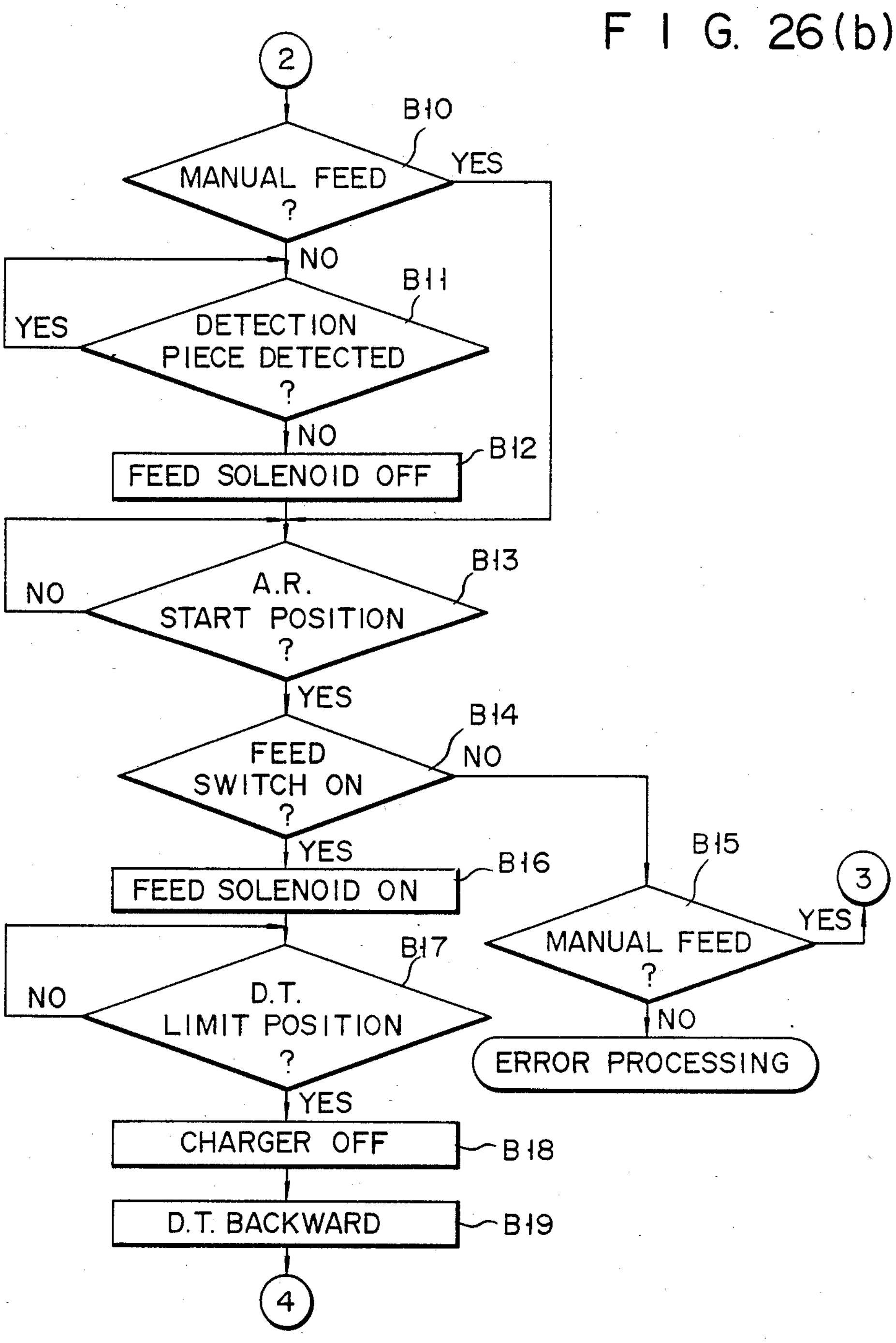
Figure 26C:
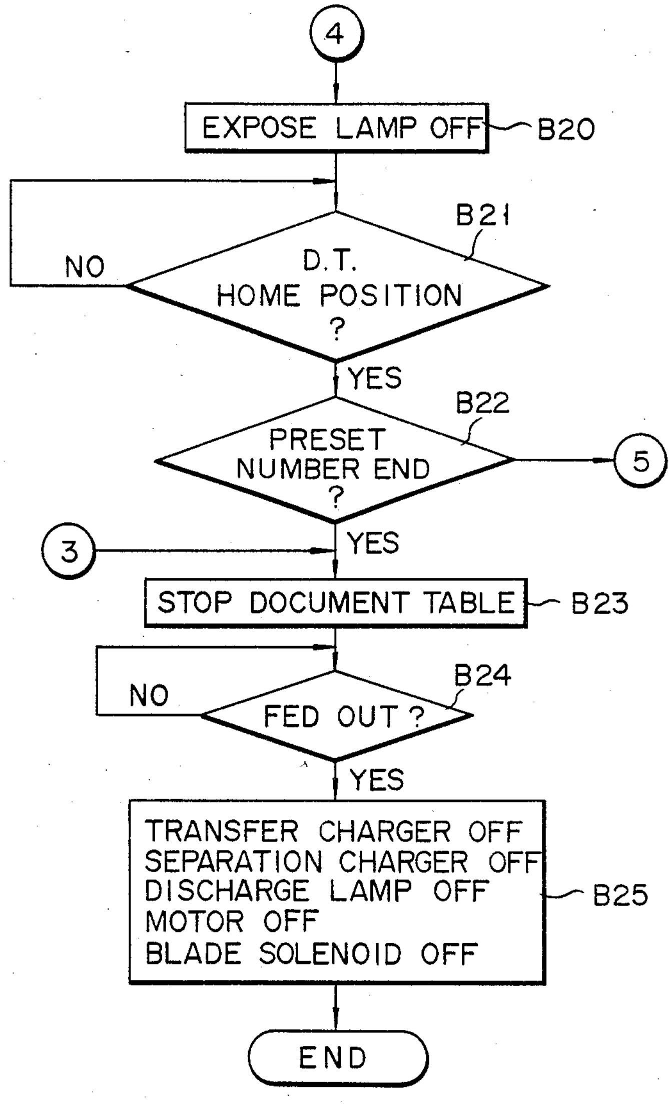

The copy operation control will be described with reference to flow charts in FIGS. 26(*a*) to 26(*c*). When the copy operation is started, the flow advances to step B1. In step B1, the blade solenoid 67, the motor 21, the discharge lamp 15 and the high voltage source 66 (chargers 13 and 16) are turned on, and the flow advances to step B2. The microprocessor checks in step B2 whether or not the document table 3 is located in the start position in accordance with the signal from the document table switches 56 and 57. If NO in step B2, the flow advances to step B3. In step B3, the microprocessor supplies a control signal to the document table clutch 36 to move the document table 3 backward, and the flow advances to step B4. However, if YES in step B2, the flow jumps to step B4. In step B4, the document table 3 is moved to the document table start position. When the document table switches 56 and 57 are simultaneously turned on to detect the document table start position, the flow advances to step B5. The microprocessor checks in step B5 whether or not manual feeding is performed. In NO in step B5, i.e., when the sheet is automatically fed from the feed cassette 9, the flow advances to step B6. In step B6, the feed solenoid 159 is energized to release the lock lever 157 from the projection 155, and the flow advances to step B7. However, if YES in step B5, the feed mechanism 8′ will not be operated, and the flow advances to step B7. In step B7, the expose lamp 4 is turned on, and the flow advances to step B8. In step B8, the microprocessor supplies a control signal to the document table clutch 36 to move the document table 3 forward, and the flow advances to step B9. In step B9, the high voltage source 64 (for the charger 6) is turned on, and the flow advances to step B10. The microcomputer checks again in step B10 whether or not manual feeding is performed. If YES in step B10, the feed mechanism 8′ is not yet operated. However, if NO in step B10, the flow advances to step B11. In step B11, the detector 164 does not detect the detection piece 163. In other words, the lock lever 157 is released from the projection 155. When the sleeve 152 and the feed roller 10 start rotating, the flow advances to step B12. In step B12, the feed solenoid 159 is turned off to lock the projection 156 with the lock lever 157, and the flow advances to step B13. In step B13, the microcomputer detects that the aligning rollers are located at the aligning roller start position, and the flow advances to step B14. The microcomputer checks in step B14 whether or not the feed switch 22 is turned on. If NO in step B14, the flow advances to step B15. The microcomputer checks again in step B15 whether or not manual feeding is performed. If YES in step B15, the feed mechanism 8′ is not operated, and the feed roller 10 is located in the reference position in FIG. 20. Therefore, the normal copy operation stop routine (steps B23 to B25 to be described later). However, if NO in step B15, the sheet is not normally fed although the feed mechanism 8′ is operated, thereby performing error processing. When the feed switch 22 is turned on in step B14, the sheet is normally fed so that the flow advances to step B16. In step B16, the feed solenoid 159 is energized to rotate the aligning rollers 11, and the flow advances to step B17. It should be noted that the feed solenoid 159 is turned off when the feed switch 22 is turned off and the sheet P passes through the aligning rollers 11. The microcomputer checks in step B17 whether or not the document table 3 is moved to the document table limit position in accordance with the detection signal from the document table switch 57. In this state, the document is entirely exposed with light, and the photosensitive drum 2 need not be charged, so that the flow advances to step B18. In step B18, the high voltage source 64 is turned off, and the flow advances to step B19. In step B19, the microprocessor supplies a control signal to the document table clutch 36 to move the document table 3 backward, and the flow advances to step B20. In step B20, the expose lamp 4 is turned off, and the flow advances to step B21. The microprocessor checks in step B21 whether or not the document table 3 is moved to the home position in accordance with the detection signal from the document switch 56. If YES in step B21, the flow advances to step B22. The microprocessor checks in step B22 whether or not the copied sheet number has reached the preset copy number. If NO in step B22, the flow returns to step B4, and the copy operation is repeated. When YES in step B22, the flow advances to step B23. In step B23, the microprocessor supplies a control signal to the document table clutch 36 to stop the document table 3, and the flow advances to step B24. The microcomputer checks in step B24 in accordance with the detection signal from the feed out switch 23 whether or not the copied sheet P is discharged. If YES in step B24, the flow advances to step B25. In step B25, the high voltage source 66, the discharge lamp 15, the motor 21 and the blade solenoid 67 are turned off to complete copy operation. The sheet is set in the waiting state shown in FIG. 25.

Figure 15:
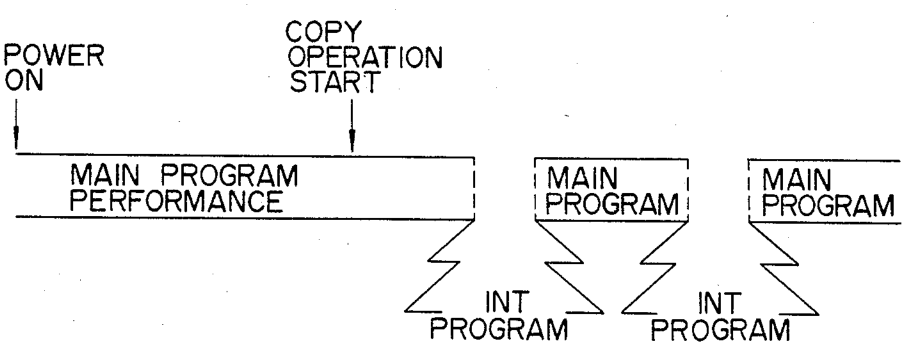
FIG. 15 is a flow chart of a program including interrupt processing of the microprocessor.
Figure 16A:
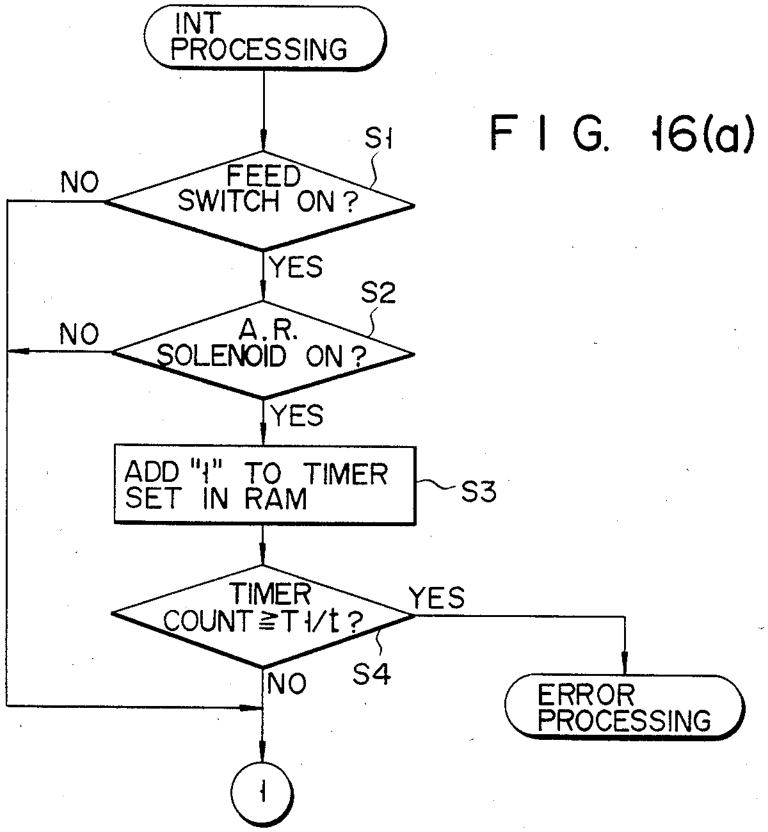
FIGS. 16(a) and 16(b) are a flow chart for explaining jam detection.
Figure 16B:
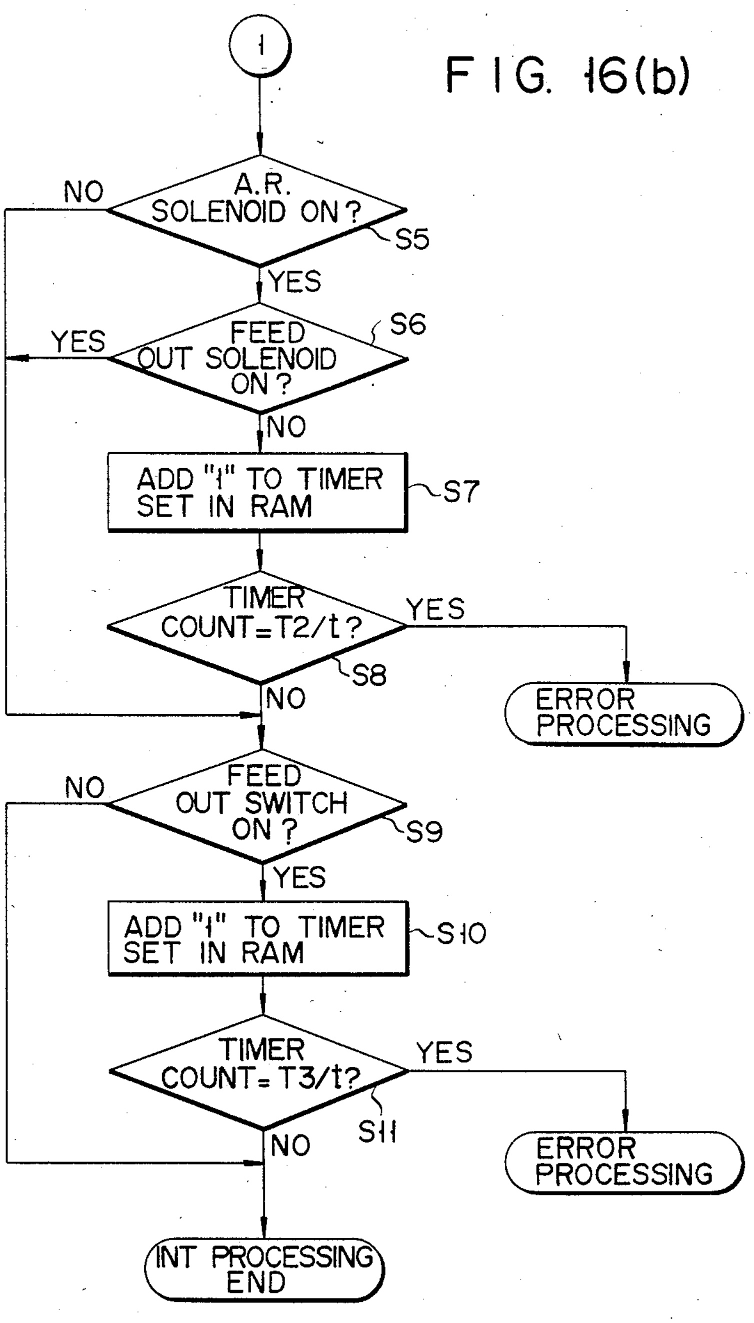

In the same manner as in the first embodiment, according to the second embodiment, the internal interrupt signal is generated in the microprocessor to control the copying machine. Interrupt processing described with reference to the first embodiment, as shown in FIGS. 15 and 16, can also be applied to the second embodiment.

Figure 27:
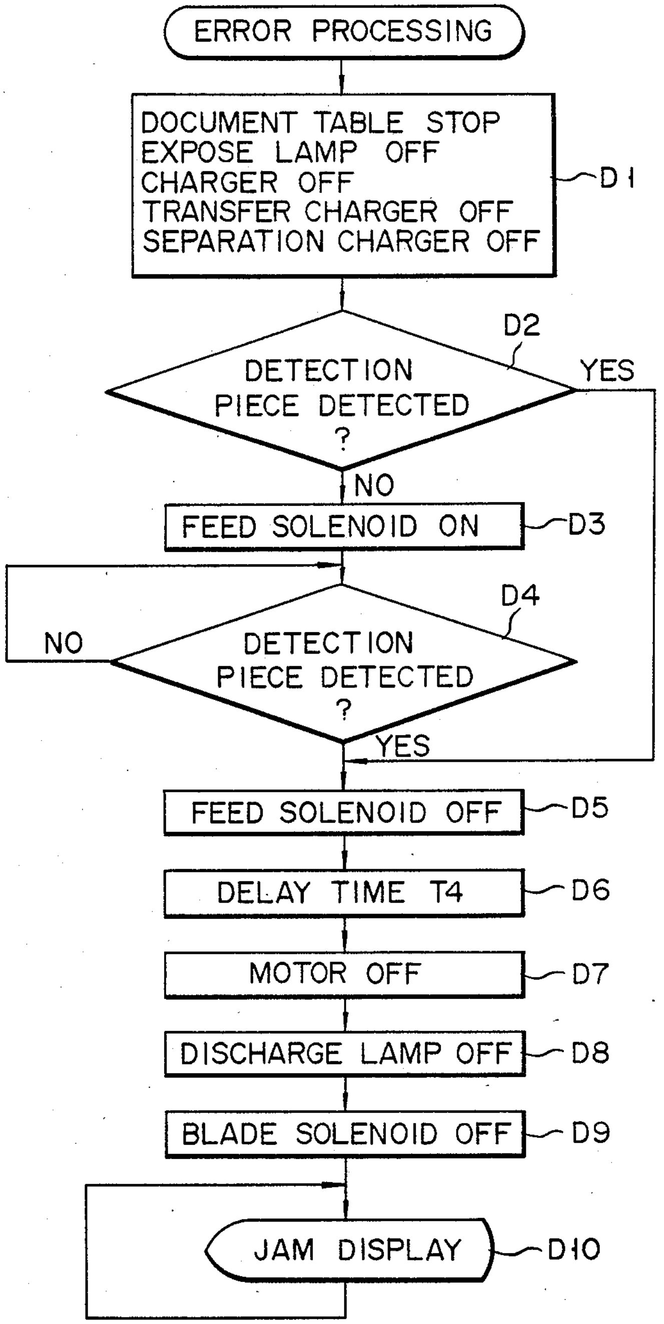
FIG. 27 is a flow chart for explaining error processing when jamming occurs in the copying machine in FIG. 18.

Error processing executed in the error check during interrupt processing according to the second embodiment will be described with reference to FIG. 27. When an error is detected, the document table 3 is stopped, and the expose lamp 4, the charger 6, the transfer charger 13 and the separation charger 16 are turned off in step D1. In this state, the positional relationship between the lock lever 157 and the projections 155 and 156 (i.e., the rotation angle of the feed roller 10) is not detected. Steps D2 to D7 are executed to set the feed roller 10 in the reference position shown in FIG. 20. In step D2, the microprocessor detects that the detector 164 detects the detection piece 163, the lock lever 157 can be engaged with the projection 155 even if the feed soleniod 159 is turned off. In step D5, the feed solenoid 159 is turned off (no operation is performed when the feed solenoid 159 has already been turned off), and the motor 21 is rotated for at least a time T4 required to engage the lock lever 157 with the projection 155 when the detection piece 163 is located at an angle which allows detection of the piece 163 by the detector 164. The feed roller 10 is thus located in the reference position. However, if NO in step D2, the state shown in FIG. 23 may be obtained. For this reason, the feed solenoid 159 is energized to engage the lock lever 157 with the projection 154 in step D3. When the microprocessor detects in step D4 that the state shown in FIG. 22 is obtained and that the detector 164 detects the detection piece 163, steps D5 and D6 are executed to set the lock lever 157 in the reference position so as to engage with the projection 155 in the same manner as the case wherein the detector 164 detects the detection piece 163. In step D7, the motor 21 is stopped. Furthermore, in step D8, the discharge lamp 15 is turned off. In step D9, the blade solenoid 67 is deenergized to separate the blade of the cleaner 14 from the photosensitive drum 2. In step D10, paper jamming is displayed, and any other function is disabled.

According to the second embodiment having the relatively simple construction described above, the feed roller 10 and the aligning rollers 11 can be controlled by the single feed solenoid 159, thereby resulting in low cost, compact construction and light weight. Automatic and manual feed modes can be properly controlled by the single solenoid.

According to the second embodiment described in detail, a paper feed apparatus can be provided wherein the feed roller and the aligning rollers can be controlled by the single solenoid, and proper control is provided for both the automatic and manual feed modes, thereby performing accurate paper feeding.

What is claimed is:

1. An image forming apparatus having a storage section for storing an image medium such that said image medium can be selectively removed from the storage section, and an image forming section for forming an image on said image medium removed from said storage section, said apparatus comprising:

a non-circular feed roller having a curved contact portion and a flat non-contact portion, said feed roller being disposed to cause said curved contact portion to contact said image medium stored in said storage section when said contact portion is adjacent to said image medium, feeding said image medium toward said image forming section and to cause said flat non-contact portion not to contact said image medium when said non-contact portion is adjacent to said image medium;

a pair of aligning roller means, arranged between said non-circular feed roller and said image forming section, for aligning said image medium taken from said storage section and for feeding said image medium to said image forming section;

a drive switching device including:

(a) a single solenoid, and (b) switching means for alternately driving: (a) said non-circular feed roller when said solenoid is in a first position, and (b) said aligning roller means when said solenoid is in a second position; and control means for:

(1) supplying, in response to an image medium feeding instruction, a first control signal to said solenoid causing said solenoid to assume said first position to thereby feed the image medium from said storage section to said aligning roller means, and a second control signal to said solenoid causing said solenoid to assume said second position to thereby feed the image medium from said aligning roller means to said image forming section, and (2) supplying, in response to a jam-clearing instruction, a third control signal to move said non-circular feed roller so that said non-contact portion is adjacent to said image medium stored in said storage section.

2. An apparatus according to claim 1, wherein said image forming medium is a paper sheet.

3. An apparatus according to claim 1, wherein said switching means includes first spring clutch means for rotating said non-circular feed roller, second spring clutch means for rotating said aligning roller means, and control lever means, driven by said solenoid, for selectively actuating said first and second spring clutches.

4. An apparatus according to claim 3, wherein said non-circular feed roller is a semicircular.

5. An image medium feeding apparatus for feeding an image medium to an image forming apparatus comprising:

storage means for containing said image medium;

feed roller means for feeding said image medium, said feed roller means being rotatable and having a contact surface and a non-contact surface, said feed roller means being disposed to cause said contact surface to contact said image medium when said contact surface is adjacent to said image medium, and to cause said non-contact surface not to contact said image medium when said non-contact surface is adjacent to said image medium;

shaft means, coupled to said feed roller means, for rotating said feed roller means, said shaft being formed with an exterior surface defining at least two external projections;

drive means for producing and coupling rotational motion to said shaft means; and locking means for coupling with one of said projections, and for releasing said one projection and coupling with another of said projections, thereby locking said shaft means at discrete locations and allowing a predetermined amount of rotation between said discrete locations, rotation of said feed roller means between said discrete locations corresponding to portions of a feeding operation.

6. An apparatus as in claim 5 wherein said image medium is a paper sheet.

7. An apparatus as in claim 6 wherein said feed roller means is of a generally semicircular shape with a cross section resembling a circle with an area defined by an arc of the circle removed.

8. An apparatus as in claim 6 wherein said projections are disposed with respect to said contact and non-contact surfaces to cause said apparatus to be in a non-feeding state when said locking means is coupled with a first projection, and to cause said apparatus to be in a partially fed state when said locking means is coupled with a second projection.

9. A device as in claim 8 further comprising aligning roller means, adjacent to said feed roller means, for rotating when said locking means has locked with said second projection, thereby further feeding said paper sheet in a direction away from said feed roller means.

* * * * *